(12) United States Patent
Gulati et al.

(10) Patent No.: US 9,302,937 B2
(45) Date of Patent: Apr. 5, 2016

(54) DAMAGE-RESISTANT GLASS ARTICLES AND METHOD

(75) Inventors: Suresh Thakordas Gulati, Elmira, NY (US); Balram Suman, Katy, TX (US)

(73) Assignee: Corning Incorporated, Corning, NY (US)

( * ) Notice: Subject to any disclaimer, the term of this patent is extended or adjusted under 35 U.S.C. 154(b) by 1296 days.

(21) Appl. No.: 13/083,847

(22) Filed: Apr. 11, 2011

(65) Prior Publication Data

US 2011/0281093 A1    Nov. 17, 2011

Related U.S. Application Data

(60) Provisional application No. 61/334,699, filed on May 14, 2010.

(51) Int. Cl.
| | |
|---|---|
| *B32B 17/00* | (2006.01) |
| *B32B 37/02* | (2006.01) |
| *B32B 37/16* | (2006.01) |
| *C03C 21/00* | (2006.01) |
| *B32B 37/08* | (2006.01) |

(Continued)

(52) U.S. Cl.
CPC ............... *C03C 21/00* (2013.01); *B32B 37/08* (2013.01); *B32B 37/144* (2013.01); *C03B 23/203* (2013.01); *C03B 27/00* (2013.01); *C03B 27/0413* (2013.01); *C03B 27/065* (2013.01); *C03C 23/007* (2013.01); *B32B 37/0015* (2013.01); *B32B 2307/54* (2013.01); *B32B 2307/558* (2013.01); *B32B 2315/08* (2013.01); *B32B 2457/208* (2013.01); *Y10T 156/10* (2015.01); *Y10T 428/2495* (2015.01); *Y10T 428/24992* (2015.01)

(58) Field of Classification Search
CPC ........ B32B 27/32; B32B 27/08; B32B 15/08; B32B 27/00; B32B 5/26; B32B 7/02; B29K 2105/06; C08L 23/0815
USPC .................................................. 428/213, 218
See application file for complete search history.

(56) References Cited

U.S. PATENT DOCUMENTS

| | | |
|---|---|---|
| 3,582,454 A | 6/1971 | Giffen |
| 3,673,049 A | 6/1972 | Giffen et al. |

(Continued)

FOREIGN PATENT DOCUMENTS

| | | |
|---|---|---|
| CN | 101764467 B | 4/2012 |
| CN | 103476727 A | 12/2013 |

(Continued)

OTHER PUBLICATIONS

Gy, Rene; Ion Exchange for Glass Strenghening; Nov. 2007; Materials Science & Engineering; vol. 149, pp. 159-165.*

(Continued)

*Primary Examiner* — Tahseen N Khan
(74) *Attorney, Agent, or Firm* — Michael A. Hood

(57) ABSTRACT

A strengthened glass article has opposing first and second compressively stressed surface portions bound to a tensilely stressed core portion, with the first surface portion having a higher level of compressive surface stress than the second surface portion for improved resistance to surface damage, the compressively stressed surface portions being provided by lamination, ion-exchange, thermal tempering, or combinations thereof to control the stress profiles and limit the fracture energies of the articles.

16 Claims, 3 Drawing Sheets

(51) Int. Cl.
- *B32B 37/14* (2006.01)
- *C03B 23/203* (2006.01)
- *C03B 27/00* (2006.01)
- *C03B 27/04* (2006.01)
- *C03B 27/06* (2006.01)
- *C03C 23/00* (2006.01)
- *B32B 37/00* (2006.01)

(56) References Cited

U.S. PATENT DOCUMENTS

| | | | |
|---|---|---|---|
| 3,737,294 A | 6/1973 | Dumbaugh, Jr. et al. | |
| 3,746,526 A * | 7/1973 | Giffon | 65/121 |
| 3,798,013 A | 3/1974 | Inoue et al. | 65/30 |
| 3,849,097 A | 11/1974 | Giffen et al. | |
| 3,931,438 A | 1/1976 | Beall et al. | |
| 4,023,953 A | 5/1977 | Megles, Jr. et al. | 65/86 |
| 4,102,664 A | 7/1978 | Dumbaugh, Jr. | 65/23 |
| 4,214,886 A | 7/1980 | Shay et al. | 65/121 |
| 4,259,118 A | 3/1981 | Sack | |
| 4,457,771 A | 7/1984 | Ambrogi | 65/66 |
| 5,342,426 A | 8/1994 | Dumbaugh, Jr. | |
| 5,559,060 A | 9/1996 | Dumbaugh, Jr. et al. | |
| 6,516,634 B1 | 2/2003 | Green et al. | 65/30.14 |
| 7,201,965 B2 | 4/2007 | Gulati et al. | |
| 7,514,149 B2 | 4/2009 | Bocko et al. | |
| 7,666,511 B2 | 2/2010 | Ellison et al. | |
| 7,871,703 B2 | 1/2011 | Shelestak et al. | |
| 8,007,913 B2 | 8/2011 | Coppola et al. | |
| 8,211,505 B2 | 7/2012 | Bocko et al. | 427/420 |
| 8,304,078 B2 | 11/2012 | Varshneya | |
| 8,312,739 B2 | 11/2012 | Lee et al. | 65/30.14 |
| 8,415,013 B2 | 4/2013 | Barefoot et al. | 428/410 |
| 8,561,429 B2 | 10/2013 | Allan et al. | 65/30.13 |
| 8,642,175 B2 | 2/2014 | Hashimoto et al. | |
| 8,813,520 B2 | 8/2014 | Hashimoto et al. | |
| 8,916,487 B2 | 12/2014 | Kawai et al. | |
| 2004/0197575 A1 | 10/2004 | Bocko et al. | |
| 2005/0083058 A1 | 4/2005 | Itoh et al. | |
| 2006/0127679 A1* | 6/2006 | Gulati et al. | 428/426 |
| 2009/0202808 A1 | 8/2009 | Glaesemann et al. | |
| 2009/0220761 A1 | 9/2009 | Dejneka et al. | |
| 2010/0009154 A1 | 1/2010 | Allan et al. | |
| 2010/0029460 A1 | 2/2010 | Shojiya et al. | |
| 2010/0035038 A1 | 2/2010 | Barefoot et al. | 428/220 |
| 2010/0084016 A1 | 4/2010 | Aitken et al. | |
| 2010/0129944 A1 | 5/2010 | Shimada et al. | |
| 2011/0017297 A1 | 1/2011 | Aitken et al. | |
| 2011/0019123 A1 | 1/2011 | Prest et al. | |
| 2011/0067447 A1 | 3/2011 | Zadesky et al. | 65/30.14 |
| 2011/0281093 A1 | 11/2011 | Gulati et al. | |
| 2011/0294648 A1 | 12/2011 | Chapman et al. | |
| 2011/0312483 A1 | 12/2011 | Nakashima et al. | |
| 2012/0194974 A1 | 8/2012 | Weber et al. | |
| 2012/0208028 A1 | 8/2012 | Hashimoto et al. | |
| 2012/0236477 A1 | 9/2012 | Weber | |
| 2012/0236526 A1 | 9/2012 | Weber | 361/807 |
| 2013/0063885 A1 | 3/2013 | Shedletsky et al. | |
| 2013/0224492 A1 | 8/2013 | Bookbinder et al. | 428/410 |
| 2013/0236666 A1 | 9/2013 | Bookbinder et al. | |
| 2014/0109616 A1 | 4/2014 | Varshneya | |
| 2014/0139978 A1 | 5/2014 | Kwong | |
| 2014/0141217 A1 | 5/2014 | Gulati et al. | |
| 2014/0174131 A1 | 6/2014 | Saito et al. | |

FOREIGN PATENT DOCUMENTS

| | | | |
|---|---|---|---|
| EP | 1376647 A2 | 1/2004 | |
| GB | 1157898 | 11/1966 | C03B 27/00 |
| KR | 2012026098 A | 3/2012 | |
| KR | 2013135834 A | 12/2013 | |
| WO | 2004/094321 | 11/2004 | C03B 17/06 |
| WO | 2011041484 A1 | 4/2011 | |
| WO | 2011041484 A1 | 7/2011 | |
| WO | 2011103798 A1 | 9/2011 | |
| WO | 2012001914 A1 | 1/2012 | |
| WO | 2012026098 A1 | 3/2012 | |
| WO | 2012074983 A1 | 6/2012 | |
| WO | 2012125857 A1 | 9/2012 | |
| WO | 2013016157 | 1/2013 | C03C 17/02 |
| WO | 2013065648 A1 | 5/2013 | |
| WO | 2013/088856 A1 | 6/2013 | |
| WO | 2013116420 | 8/2013 | C03C 21/00 |
| WO | 2013116420 A1 | 8/2013 | |
| WO | 2013154034 A1 | 10/2013 | |
| WO | 2014030738 A1 | 2/2014 | |

OTHER PUBLICATIONS

Lapp, "AMLCD Substrates Trends in Technology: Technical Information Paper," dated Nov. 2014, pp. 1-5, Corning Incorporated, New York.

Borelli et al., "Glass Strengthening with an Ultrafast Laser," dated 2008, pp. 185-189, Paper M404, International Congress on Applications of Lasers & Electro-Optics.

R. Clasen; "Preparation and Sintering of High-Density Green Bodies to High-Purity Silica Glasses"; Journal of Non-Crystalline Solids 89 (1987); pp. 335-344.

A. Fluegel; "Thermal expansion calculation for silicate glasses at 210° C. based on a systematic analysis of global databases"; Glass Technol.: Eur. J. Glass Sci. Technol. A (Oct. 2010) 51, 5; pp. 191-201.

Fillery et al.; "Ion-Exchanged Glass Laminates that Exhibit a Threshold Strength"; J. Am. Ceram. Soc., 90,8 (2007); pp. 2502-2509.

* cited by examiner

DAMAGE-RESISTANT GLASS ARTICLES AND METHOD

CROSS-REFERENCE TO RELATED APPLICATIONS

This application claims the benefit of priority under 35 U.S.C. §119(e) of U.S. Provisional Application Ser. No. 61/334,699 filed on May 14, 2010.

FIELD OF THE DISCLOSURE

The present disclosure relates to strengthened glass articles, and more particularly to glass articles produced by strengthening opposing glass surfaces of the articles by unequal amounts.

TECHNICAL BACKGROUND

The strengthening of glass articles through the introduction of compressive stresses into the surfaces of the articles can be accomplished by thermal tempering, ion-exchange or chemical tempering, and the lamination of glass surface layers to glass core layers. Thermal tempering involves rapidly cooling the surfaces of a hot glass article to set the surface glass while allowing the core glass to contract through slower cooling. Ion-exchange strengthening or so-called chemical tempering typically involves exchanging large mobile ions from the surfaces of the glass with smaller ions in the interior of glass which can introduce compressive stresses into the glass surfaces. In laminar strengthening, glass surface layers or skins of relatively low thermal expansion are fused to glass core layers of relatively high thermal expansion so that compressive stress can develop in skins as the laminated articles are cooled following fusion.

While each of these known methods of glass strengthening has been employed successfully to improve the suitability of glass for a number of existing technical applications, new applications have imposed higher demands on the ability of glass materials to resist surface damage in use. In some flat glass applications, for example, the damage resistance of one of the surfaces of the glass needs to be superior to the damage resistance of the other surface, because one of the surfaces sees more abuse in day-to-day use than the other surface. Touch screen displays are an example of an application where increased surface damage resistance in the active or exposed surface of the displays is presently required.

In most instances the known methods of glass strengthening have been used to induce uniform compressive stresses and uniform depths of surface compression on each of the two surfaces of the glass article being strengthened. While resistance to surface damage can be improved in some cases through modifications of these methods to increase the levels of surface compression in the articles, the results are not satisfactory for a number of applications. One disadvantage, for example, is that increasing surface compression can correspondingly increase core tension. High core tensions in strengthened glass articles can undesirably increase the fracture energy of the article in the event of breakage.

SUMMARY

In accordance with the present disclosure, strengthening methods are employed to provide glass articles wherein one surface, termed the primary surface, is provided with a higher level of surface compression and/or a higher depth of surface compression layer than the other surface. The primary surface will serve as the surface exposed to more severe or frequent damage in service. A particular advantage of this so-called asymmetric strengthening is that better control over the properties of the asymmetrically strengthened article, such as for example the level of compression in the opposing surfaces and the level of tensile stress in the core of the article, can be effectively controlled.

In a first aspect, therefore, the present disclosure encompasses a glass article having opposing first and second compressively stressed surface portions bound to a tensilely stressed core portion, wherein the first surface portion has a higher level of surface compression than the second surface portion. Such glass articles are thus asymmetrically strengthened, with asymmetric surface stresses and asymmetric stress profiles across the thickness of the articles.

In some embodiments according to the present disclosure the surface compression in at least the first surface portion of a disclosed article is produced by thermal tempering; in other embodiments the surface compression is developed through differential ion-exchange treatment of opposing surfaces. Further embodiments include those wherein at least the first surface portion of the strengthened article comprises a layer of glass having a composition differing from a composition of the core portion; such embodiments can be provided, for example, by an ion-exchange treatment of at least the first surface portion or by forming that surface portion through the fusion of a layer of skin glass to the core glass of the article.

BRIEF DESCRIPTION OF THE DRAWINGS

The articles and methods disclosed herein are further described below with reference to the appended drawings, wherein.

DETAILED DESCRIPTION

In general, the commercial tempering of silicate glass articles of plate and tube configuration involves the symmetric cooling of the articles from temperatures above the transformation range of the glass to room temperature. The resulting stress profiles are parabolic through the thickness of the article, with levels of surface compression being about twice the level of central tension. The magnitude of the central tension depends linearly on the cooling rate R and thermal expansivity $\alpha'$ of the glass, quadratically on the thickness t of the glass, and inversely on the thermal diffusivity k of the glass, with the depth of the resulting surface compression layers being about 21% of the thickness t. In certain embodiments according to the present disclosure, glass articles with opposing compressively stressed surfaces of differing compressive stress level are provided through asymmetric thermal tempering, such that both major surface portions of the articles are thermally tempered, but to different degrees.

For example, the rates of cooling used to temper the opposing surfaces can be unequal, with the first surface of the article being cooled more rapidly than the second surface. The second surface may be cooled more slowly than the first surface, or it may be otherwise treated, e.g., by ion-exchange or other means, to develop a level of compressive stress that is less than that of the first surface. Asymmetric tempering enables improved control over surface compressive stress levels and depths of compression layer, thus enhancing resistance to surface damage and with only minimal changes in stored tensile energy, i.e. fracture energy, and in warping tendency.

The heat transfer equations applicable to thermal tempering can be extended to asymmetric tempering both for flat plates (Cartesian coordinates) and for cylindrical tubes (polar coordinates). The following equations apply to the case of a glass plate where both surfaces are thermally tempered, but where the cooling rates for the two surfaces are unequal.

The classical differential equation for heat transfer during the cooling of a flat glass plate is given by:

$$\frac{\partial}{\partial z}\left(K\frac{\partial T}{\partial z}\right) = \rho c_p \frac{\partial T}{\partial t} \quad (1)$$

and that for a circular glass tube by:

$$\frac{1}{r}\frac{\partial}{\partial r}\left(Kr\frac{\partial T}{\partial r}\right) = \rho c_p \frac{\partial T}{\partial t} \quad (2)$$

where T denotes temperature, t the time, K the thermal conductivity, $\rho$ the density, $c_p$ the specific heat, z the thickness coordinate for the flat plate. Assuming a constant cooling rate R typical of a conventional commercial tempering process, the solution of eqn. (1) subject to boundary conditions $T=T_i$ at $t=0$ is given by $$T(z) = T_i + (R/2k)z^2 \quad (3)$$

wherein k is the thermal diffusivity of the glass, defined as $(K/\rho c_p)$.

Figure 1:
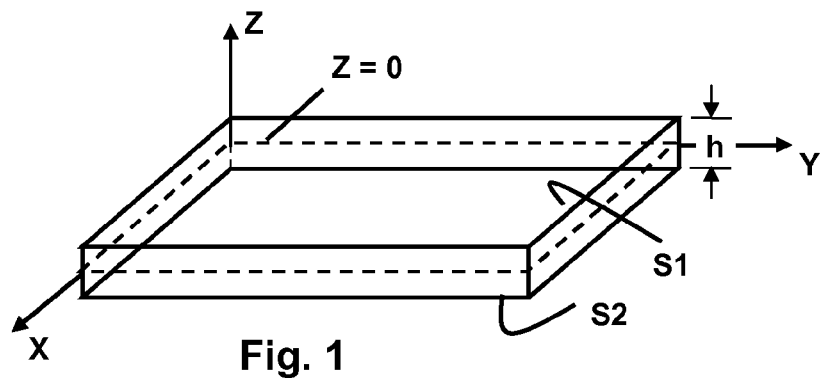
FIG. 1 is a schematic orthogonal view of a flat glass plate.

FIG. 1 of the drawings presents an isometric view of a flat glass plate section 10 of thickness h in the x-y-z coordinate system. Where such a plate section is cooled symmetrically on both of surfaces S1 and S2, the temperature profile through its thickness is parabolic and the average temperature, obtained by integrating eqn. 3 from $z=-0.5h$ to $z=0.5h$, is found to be:

$$T_{av} = T_i + [Rh^2/24k] \quad (4)$$

The resulting tempered glass stress distribution through the thickness of plate section 10 is symmetric, and given at any location z across the plate thickness by:

$$\rho(z) = \{E\alpha'/(1-\nu)\}[T(z) - T_{av}] \quad (5)$$

wherein $\alpha'$ denotes the expansivity or coefficient of thermal expansion of the glass in the glass transformation range, E is the Young's Modulus of the glass, and $\nu$ is the Poisson's Ratio for the glass. Equation (5) satisfies force equilibrium in the z direction. The surface compression $\sigma_s$ and the center tension $\sigma_c$ within the mid-plane of the glass plate (indicated by the broken line at $Z=0$ in FIG. 1), follow from eqn. 5, namely $$\sigma(+/-0.5h) = \sigma_s = \sim\{E\alpha'/(1-\nu)\}[h^2 R/(12k)] \quad (6a)$$

$$\sigma(0) = \sigma_c = \{E\alpha'/(1-\nu)\}[h^2 R/(24k)] \quad (6b)$$

Equations (6a) and (6b) confirm that the center tension is one-half of surface compression for a symmetrically cooled plate. Further, setting equation (5) to zero yields the depth of compression layer $\delta$ as:

$$\delta = 0.21h \quad (7)$$

The substantial depth of compression secured through thermal tempering is achieved without excessive center tension, a particularly advantageous feature where both surface damage protection and a low fracture energy are required.

Figure 2:
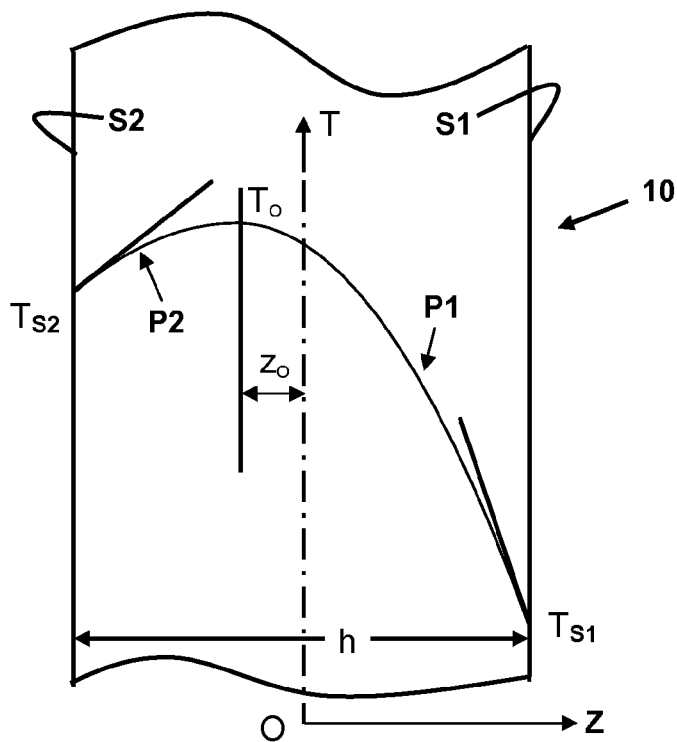
FIG. 2 is an edge view of a glass plate showing a temperature profile.

In the case of asymmetric tempering, the cooling rate is different on each of the two surfaces. For example, cooling may be at a rate of $R_1$ on a surface S1 of a plate 10 such as shown in FIG. 1 of the drawing, and a lower rate of $R_2$ on surface S2 of that plate. FIG. 2 of the drawings provides a schematic illustration of a cross-section of a glass plate such as a plate 10 upon which are superimposed temperature profile curves that are representative of profiles that can be developed through the use of differential cooling rates. As shown in FIG. 2, plate 10 has a thickness h as measured along the horizontal z axis extending from origin O, with relative glass temperatures being reported on vertical axis T extending from the origin and lying in the mid-plane of plate thickness h.

The temperature profiles across glass plate 10 that result from cooling the two plate surfaces S1 and S2 at two different rates $R_1$ and $R_2$ are parabolic and asymmetric, consisting of two different parabolas P1 and P2. Those parabolas merge at $z=z_o$, i.e., in a plane parallel with but offset from the mid-plane of plate 10 by a distance $z_o$. The higher cooling rate $R_1$ cools a larger thickness of plate 10 ($0.5h+z_o$), while the lower cooling rate $R_2$ cools a smaller thickness of the plate ($0.5h-z_o$).

Continuity conditions require that both the temperature T and the temperature gradient at $z=z_o$ be identical, whether derived from parabola P1 or parabola P2. Therefore, $$T_1(-z_o) = T_2(-z_o) = T_i, \text{ and}$$

$$dT_1/dz(-z_o) = dT_2/dz(-z_o) = 0$$

Integrating the second equation above once, we obtain:

$$dT_1/dz = (z+z_o)R_1/k \text{ for parabola } P1$$

$$dT_2/dz = (z+z_o)R_2/k \text{ for parabola } P2$$

where k is the thermal diffusivity of the glass as above described. Further integration then yields:

$$T_1(z) = T_i + (z+z_o)^2(R_1/2k), -z_o < z < 0.5h \quad (8)$$

$$T_2(z) = T_i + (z+z_o)^2(R_2/2k), -0.5h < z < -z_o \quad (9)$$

with equations 8 and 9 satisfying the required continuity conditions. The average temperature of such an asymmetrically cooled plate is given by $$T_{av} = T_i + (R_1/6kh)(0.5h+z_o)^3 + (R_2/6kh)(0.5h-z_o)^3 \quad (10)$$

while the equations for the resulting tempering stresses $\sigma_1$ and $\sigma_2$ as functions of plate cross-sectional locations z over parabolic regions P1 and P2 are, respectively:

$$\sigma_1(z) = \{E\alpha'/(1-\nu)\}(R_1/6kh)[\{3h(z+z_o)^2 - (0.5h+z_o)^3 - \lambda(0.5h-z_o)^3\}], -z_o < z < 0.5h \quad (11)$$

$$\sigma_2(z) = \{E\alpha'/(1-\nu)\}(R_2/6kh)[\{3h(z+z_o)^2 - (0.5h-z_o)^3 - (0.5h+z_o)^3/\lambda\}], -0.5h < z < -z_o \quad (12)$$

wherein $\lambda = R_2/R_1$, the ratio of the plate surface cooling rates.

Figure 3:
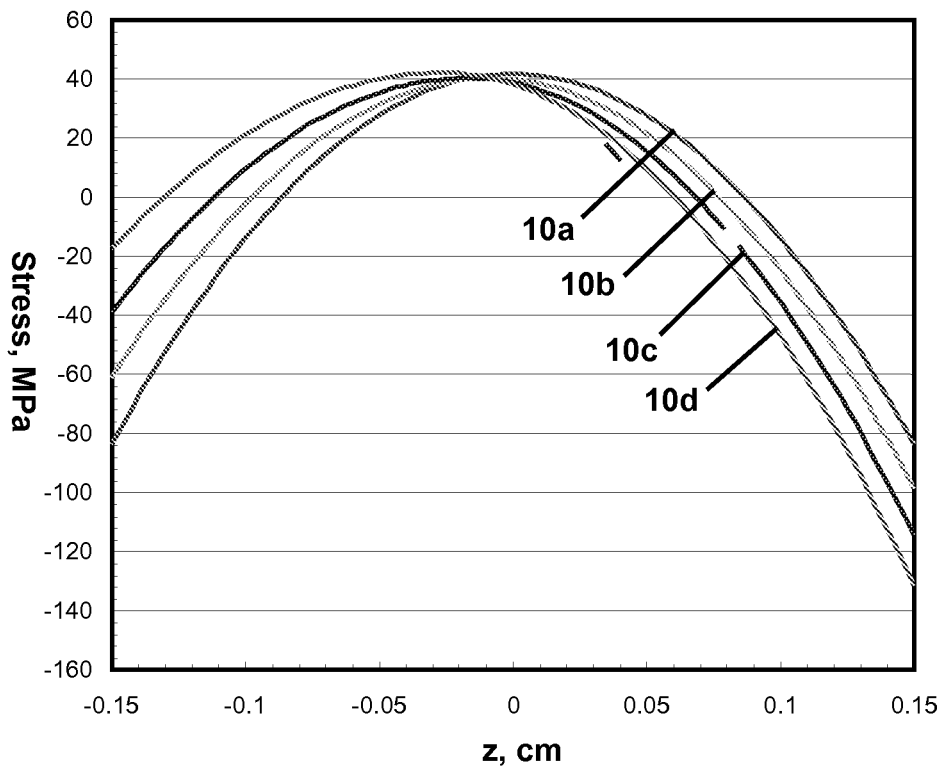
FIG. 3 is a diagram presenting stress profiles for thermally tempered glasses.

The surface compressions and stress distributions achievable through asymmetric tempering at a selected cooling rate ratio can be determined by measurement or calculation for any particular glass composition selected for fabricating a glass article in accordance with the present disclosure. FIG. 3 of the drawing compares the calculated stress profile of a symmetrically tempered glass plate with the calculated stress profiles for three asymmetrically tempered plates, all four plates being of identical 3-mm thickness and soda-lime silicate glass composition. The relevant physical properties of the glass selected for the comparisons in FIG. 3 are reported in Table 1 below.

TABLE 1

Typical Physical Properties-Soda-Lime Silica Glass

| | |
|---|---|
| Young's Modulus E (GPa) | 72 |
| Poisson's Ratio $\nu$ | 0.22 |
| Coeff. Thermal Expansion $\alpha'$ (cm/cm/C.) | $11 \times 10^{-6}$ |
| Thermal Diffusivity k (cm$^2$/sec) | 0.0084 |

The symmetrically tempered glass plate (curve 10a in FIG. 3) has a stress profile produced by cooling both surfaces of the plate at a cooling rate of $-90°$ C./sec. (i.e., $R_1 = R_2$, or a cooling rate ratio of 1.0). The three asymmetrically tempered plates are tempered at cooling rate ratios $R_2/R_1$ of 0.9, 0.8 and 0.7 (Curves 10b, 10c and 10d, respectively). As the curves in FIG. 3 reflect, the use of cooling rate ratios increasingly below 1.0 produces increasing levels of compressive stress (higher negative values of $\sigma_1$ at plate surface S1), together with increasing depths of compression layer (peak tensile stress planes shifted toward negative values of z). As can be seen from FIG. 3, the depth of compression layer is larger for surface S1 that experiences the higher cooling rate, and vice-versa.

From data such as shown in FIG. 3 it can be determined that the ratio of cooling rates $R_2/R_1$ used for asymmetric tempering should be about 0.7 or greater, to avoid the possibility of developing tensile stress at the more slowly cooled plate surfaces. As is known, glass fracture can easily be initiated from surface flaws present on glass surfaces that are placed under tension.

Yet another consideration for the case of asymmetric tempering arises from the fact that asymmetric levels of surface compression can cause warpage of flat glass plates, if the plates are thin and the edges of the plates are not constrained. However, the warp magnitudes are generally small, the warp or sagitta being readily estimated from the equation:

$$s = l^2/8\rho \quad (13)$$

wherein l denotes the length of the plate and $\rho$ its radius of curvature. The radius of curvature depends on the elastic properties of the glass according to the equation:

$$\rho = \{Eh^3/(1-\nu^2)\}/12M \quad (14)$$

wherein M, the bending moment responsible for warp, is given by $$M = \{E\alpha'/(1-\nu)\}(R_1/6k)[(3/64)h^4 + (1/4)z_o h^3 + (3/8)z_o^2 h^2 - (1/4)z_o^4 - (R_2/R_1)\{(3/64)h^4 - (1/4)z_o h^3 + (3/8)z_o^2 h^2 - (1/4)z_o^4\}] \quad (15)$$

In asymmetrically tempered plates wherein the plate edges are constrained from warping, a bending moment with sign reversed from equation (15) is introduced at plate edges. That bending moment reduces compressive stress on one plate surface while adding a similar amount of compressive stress on the other surface.

The advantages of asymmetric tempering and surface compression are not limited to glass articles of plate-like configuration, but extend to other shapes, such as cylindrical glass tubes, as well. The integration and analysis of differential heat transfer equations by steps analogous to those for the case of asymmetric plate cooling as disclosed above permit calculations of the asymmetric stress profiles resulting from the cooling of the interiors and exteriors of glass tubes at differing cooling rates. Embodiments of the presently disclosed glass articles that comprise asymmetrically tempered tubing wherein high surface compression is developed in exterior tubing surface offer particular advantages where protection from exterior tubing damage is required.

The case of glass tubing of soda-lime silica composition with inner radius a=2.5 cm and outer radius b=2.7 cm is illustrative. Starting at a uniform initial glass tubing temperature of 650° C., the outer surfaces of a series of glass tubes are cooled at a cooling rate 90° C./sec ($R_o = -90$) while the inner surfaces are cooled at one of a series of lower cooling rates $R_i$. Cooling rate ratios $R_i/R_o$ in the range of 0.1 to 1.0 are selected for analysis.

Figure 4:
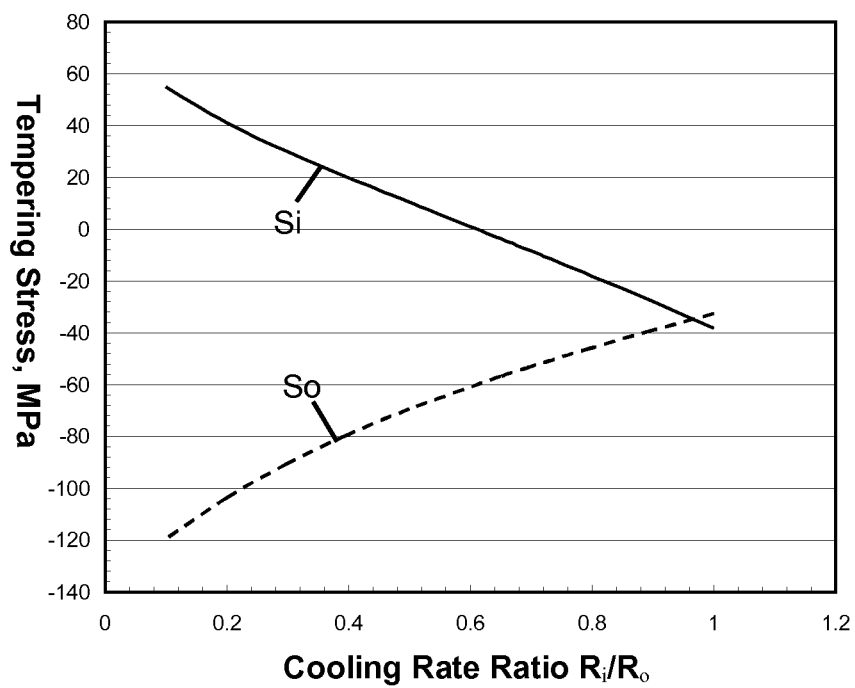
FIG. 4 is a diagram plotting tempering stress versus cooling rate for a glass surface.

The asymmetric stress profiles calculated from such differential tempering treatments are reflected in FIG. 4 of the drawings. FIG. 4 presents curves plotting surface stress levels for the inner surfaces (curve Si) and outer surfaces (curve So) of each of the series of asymmetrically tempered tubes. The applicable cooling rate ratios $R_i/R_o$ are shown on the horizontal axis and the resulting surface stress levels in MPa on the vertical axis, with the more negative stress level values representing higher surface compression in accordance with convention.

The outer surface (So) stress levels in FIG. 4 indicate that outer surfaces of the tubes are always in compression, with rapidly increasing compressive stress levels being achievable at lower cooling rate ratios. The inner surface (Si) stress levels, on the other hand, begin to decrease at similarly rapid rates, such that inner tubing surfaces begin to experience tension at cooling ratios below about 0.6. Thus insuring surface compression on both tubing surfaces generally requires that cooling rate ratios of at least 0.6 be employed.

The depths $\delta$ of the surface compression layers developed on the above-described tubing samples can also be calculated from the properties of the glass and the heat transfer equations. Table 2 below sets forth inner surface (Si) and outer surface (So) compression layer depth values $\delta$ for those members of the series of asymmetrically tempered tubes of soda-lime silica composition yielding surface compression layers on both inner and outer tube surfaces within the given range of cooling rate ratios $R_i/R_o$.

TABLE 2

Compression Layer Depths-Tempered Glass Tubing

| $R_i/R_o$ | $\delta$-So (mm) | $\delta$-Si (mm) |
|---|---|---|
| 1.0 | 0.43 | 0.40 |
| 0.9 | 0.45 | 0.38 |
| 0.8 | 0.52 | 0.26 |
| 0.7 | 0.56 | 0.16 |
| 0.6 | 0.62 | 0.01 |

As the Table 2 data suggest, the greater compression layer depths $\delta$ on outer tubing surfaces (So), ranging from 0.43 mm to 0.63 mm, result from the higher surface cooling rates for those surfaces, whereas the inner surface compression layer depths $\delta$ range from 0.40 to as little as 0.01 mm.

Among the further embodiments of the presently disclosed glass articles are articles wherein the surface compression in at least one of the opposing compressively stressed surface portions surrounding the tensilely stressed core portion is produced by an ion-exchange treatment. Ion-exchange treatments, including treatments wherein the surface compression in both surface portions is developed through ion exchange treatments of both surface portions, but to differing degrees, enable the development of asymmetrically compressively stressed surface layers that can exhibit stress profiles and depths of surface compression quite different from those produced by asymmetric thermal tempering, and advantageous for certain applications. A natural consequence of such asymmetric ion-exchange strengthening is that the opposing surface portions of the article have compositions differing from each other as well as from the core portion of the article.

As was the case for asymmetric thermal tempering, equations enabling the calculation of compressive stress levels and depths of surface compression for glass plates or sheets can be derived from the fundamental differential equation governing transport of mobile ions in glasses, conventionally given by:

$$\frac{\partial}{\partial z}\left(D\frac{\partial C}{\partial z}\right) = \frac{\partial C}{\partial t}, \tag{101}$$

wherein D is the ion diffusion coefficient for the selected glass and the selected ion (eg., Na, K, Li, etc.), C is the concentration of the exchanged ions, z is the thickness coordinate for a flat glass plate or sheet, and t is the ion diffusion time. The boundary conditions for solving equations (101) are:

$C=C_1$ at $z=h/2$ (top surface), and $C=C_2$ at $z=-h/2$ (bottom surface) \hfill (102)

with the initial condition everywhere in the plate being:

$C=C_o$ at $t=0$ \hfill (103)

and therefore that:

$C_o < C_1$ and $C_o < C_2$

Concentration equations for symmetric ion-exchange wherein the ion concentrations at top and bottom surfaces are the same ($C_1=C_2$) have been reported. In the symmetric case the notation $C_1$ can be used for both surface concentrations. A simple known method of obtaining a solution is to use a similarity transport. An expression for concentration in the upper half of glass plate becomes:

$$\frac{C(z) - C_o}{C_1 - C_o} = 1 - \text{erf}\left(\frac{h/2 - z}{\sqrt{4Dt}}\right) \text{ for } h/2 > z > 0 \tag{104}$$

where erf denotes the error function. The error function is defined as:

$$\text{erf}(\eta) = \frac{2}{\pi}\int_0^\eta \exp(-\xi^2)\,d\xi \tag{105}$$

with erf(0)=0, and erf(1)=0.8427. Similarly, an expression for concentration in the lower half of glass plate is given by:

$$\frac{C(z) - C_o}{C_1 - C_o} = 1 - \text{erf}\left(\frac{h/2 + z}{\sqrt{4Dt}}\right) \text{ for } 0 > z > -h/2 \tag{106}$$

Since the concentration C(z) is a known function of z, the average concentration $C_{av}$ can be obtained by integrating from $z=h/2$ to $z=-h/2$:

$$C_{av} = C_o + 4(C_1 - C_o)\sqrt{\frac{k}{\pi}} \tag{107}$$

where $k=Dt/h^2$.

The ion-exchange stress distribution through the thickness is symmetric and given by known equation (108) at any location z across the plate thickness:

$$\sigma(z) = -\frac{EB}{1-\upsilon}[C(z) - C_{av}], \tag{108}$$

where B denotes the lattice dilation constant and $B[C(z)-C_{av}]$ represents the uniaxial strain induced by ion-exchange. Equation (108) satisfies force equilibrium in the z direction.

The surface compression $\sigma_s$ and center tension $\sigma_c$ then follow from equation (108), namely $$\sigma\left(\pm\frac{h}{2}\right) = \sigma_s = -\frac{EB}{1-\upsilon}(C_1 - C_{av}) \tag{109a}$$

$$\sigma(0) = \sigma_c = -\frac{EB}{1-\upsilon}(C_o - C_{av}) \tag{109b}$$

As equations (109a) and (109b) suggest, the ratio of the center tension and surface compression is the ratio of the concentration difference between the plate mid-plane and plate surfaces relative to the average concentration for the ion-exchanged plate. Setting equation (109a) to zero yields the depth of compression layer $\delta$, which may be obtained numerically using the known values of $C_o$ and $C_1$.

For the case of asymmetric ion-exchange, the exchanged ion concentration is different at each of the two surfaces, defined as $C_1$ at top surface S1 and $C_2$ at bottom surface S2. The quantities $C_1$ and $C_2$ are constant. The concentration profile, which is no longer symmetric, consists of two error functions which merge at $z=z_o$. The error function for $C_1$ is valid from $z=h/2$ to mid-plane location $z=z_o$ and that for $C_2$ is valid from $z=z_o$ to $z=-h/2$. The location $z_o$ is obtained by assuming that the depth over which the surface concentration ($C_1$ or $C_2$) has an effect is proportional to the concentration difference:

$$\frac{d_1}{d_2} = \frac{h/2 - z_o}{z_o + h/2} = \frac{C_1 - C_o}{C_2 - C_o} \tag{112}$$

where $d_1$ and $d_2$ are the depths affected by $C_1$ and $C_2$, respectively. Equation (112) can be solved for $z_o$:

$$z_o = \frac{h}{2}\left(\frac{C_2 - C_1}{C_1 + C_2 - 2C_o}\right) \tag{113}$$

As expected, for $C_1 > C_2$, $z_o$ is negative meaning that $C_1$ has effect to a greater depth (more than h/2) and vice versa. In this case, expressions for concentration are given by:

$$\frac{C(z) - C_o}{C_1 - C_o} = 1 - \text{erf}\left(\frac{h/2 - z}{\sqrt{4Dt}}\right) \text{ for } h/2 > z > z_o \quad (114a)$$

$$\frac{C(z) - C_o}{C_2 - C_o} = 1 - \text{erf}\left(\frac{h/2 + z}{\sqrt{4Dt}}\right) \text{ for } z_o > z > -h/2 \quad (114b)$$

The average concentration for asymmetric ion-exchange is readily obtained by integration over the glass thickness:

$$C_{av} = C_o + 2(C_1 + C_2 - 2C_o)\sqrt{\frac{k}{\pi}} \quad (115)$$

Similarly, the asymmetric surface stress profiles are given by $$\sigma(z) = \quad (116a)$$
$$-\frac{EB}{1-\nu}\left(C_1 + (C_o - C_1)\left(\text{erf}\left(\frac{h/2-z}{\sqrt{4Dt}}\right)\right) - C_{av}\right) \text{ for } h/2 > z > z_o$$

$$\sigma(z) = \quad (116b)$$
$$-\frac{EB}{1-\nu}\left(C_2 + (C_o - C_2)\left(\text{erf}\left(\frac{h/2+z}{\sqrt{4Dt}}\right)\right) - C_{av}\right) \text{ for } z_o > z > -h/2$$

where the expressions for C(z) are substituted from equations (114a) and (114b) into equation (108).

Figure 5:
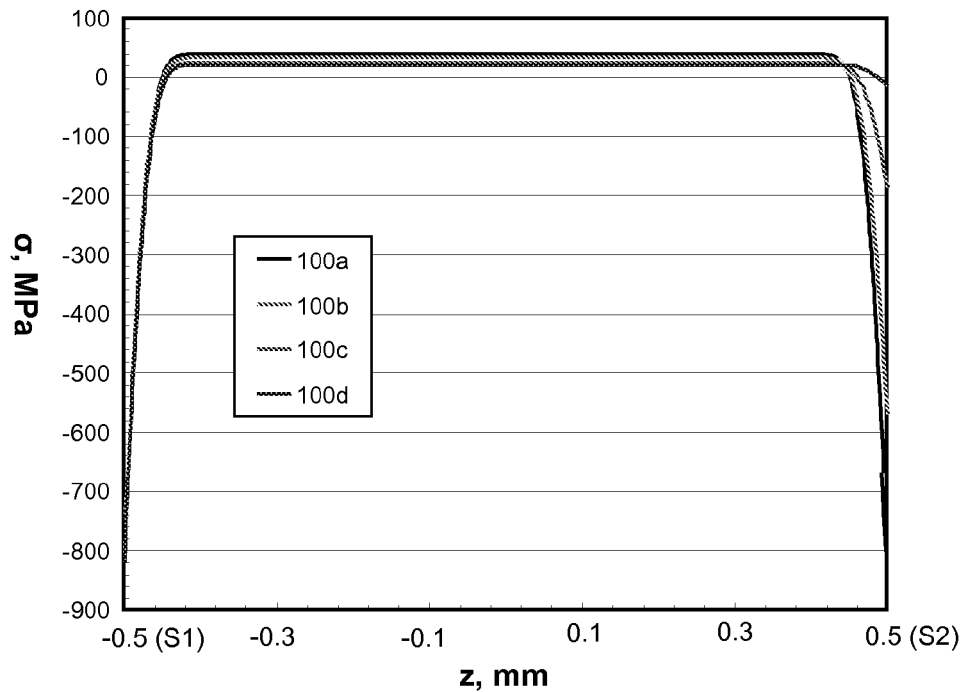
FIG. 5 is a diagram presenting stress profiles for ion-exchanged glasses.

FIG. 5 of the drawings compares stress profiles for a symmetrically ion-exchanged 1-mm thick glass plate with $C_1=C_2=13.23$ mol % (curve 100a) against three asymmetrically ion-exchanged glass plates. Stress levels ($\sigma$) are reported in MPa on the vertical graph axis and plate cross-sectional location z on the horizontal axis. The asymmetrically ion exchanged plates are of the same geometry and base glass composition and have the same first surface (S1) exchanged ion concentration as the symmetrically ion-exchanged plate, but with varying lower exchanged-ion concentrations on the second plate surface (S2), i.e., with $C_1=13.23$ mol % and $C_2=10.23$, 5.23, or 2.7 mol % (curves 100b, 100c and 100d, respectively). The exchanged-ion concentration in the base glass composition ($C_o$) is 2.55 mol %. The physical properties of the base glass and the diffusion time (t) employed to reach the $C_1$ exchanged-ion concentration are reported in Table 3 below.

TABLE 3

Physical properties and ion-exchange parameters

| | |
|---|---|
| Young's Modulus E (MPa) | 72900 |
| Poisson's Ratio ν | 0.211 |
| B (m/m/mol %) | 11 × 10$^{-6}$ |
| Diffusivity D (m$^2$/sec) | 1.1 × 10$^{-14}$ |
| t, sec | 28800 |
| Thickness, mm | 1 |

As the stress profile curves in FIG. 5 reflect, decreasing exchanged-ion concentrations at S2 result in decreasing S2 compressive stress levels $\sigma$ and decreasing depths $\delta$ of compression layer at that surface, although the difference in compression layer depths $\delta_t$ and $\delta_b$ as between the top and bottom surfaces is not large. For example, where the ratio of exchanged-ion concentration ($C_1$) at top surface S1 to the exchanged-ion concentration ($C_2$) at bottom surface S2 is about 0.6, the top surface compression level is approximately 800 MPa and the bottom surface compression level is approximately 400 MPa. At those compression levels the depths of the compression layers are approximately 0.054 mm and 0.047 mm, respectively. Thus both surfaces incorporate relatively deep compression layers, a characteristic that is particularly advantageous when protection against bottom surface as well as top surface damage is required.

The analyses of asymmetric ion-exchange strengthening set forth above do not account for plate bending contributions since the plates being characterized are not edge-constrained. As was the case for asymmetric thermal tempering, edge constraints will modify the stress distribution profile of a glass plate comprising ion-exchanged surface compression layers, generally by increasing surface compression on the plate surface having the highest unconstrained compressive stress level and decreasing surface compression on the opposite plate surface. However, for the case of asymmetric ion-exchange strengthening, analyses based on the elastic properties of glass indicate that, even for modest plate thicknesses, warp is sufficiently small that it is not problematic for most applications.

Still further embodiments of the presently disclosed glass articles are articles provided by laminating the surface portions to a glass core differing in composition and physical properties from the surface portions, but wherein the laminated surface portions exhibit differing levels of compressive stress. For example, asymmetric lamination embodiments can provide glass articles wherein the opposing compressively stressed surface portions joined to the tensilely stressed core are of differing thicknesses, or differing compositions and thermal expansivities, thus providing compressive stress in a first surface portion that differs from the compressive stress in a second surface portion. The characteristics of such articles compare favorably with those of articles comprising asymmetric cross-sectional stress profiles provided by thermal or chemical ion-exchange tempering or strengthening, and offer further advantages for certain applications.

Figure 7:
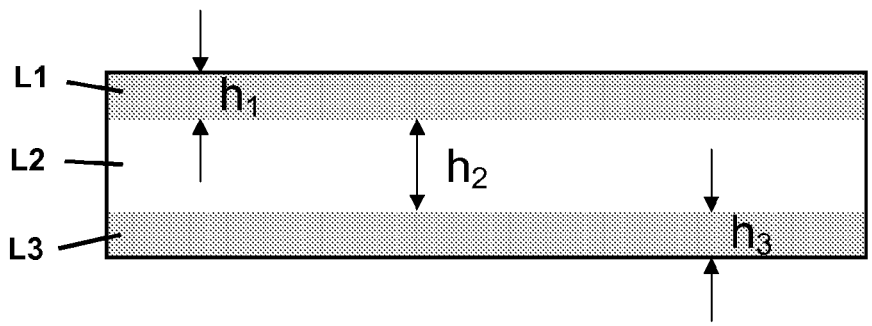
FIG. 7 is a schematic elevational cross-section of a laminated glass.

For purposes of the following analysis reference is made to FIG. 7 of the drawings schematically showing an elevational diagram of a laminated article, not in true proportion or to scale. The article comprises a first surface layer or skin L1, a core layer L2, and a second surface layer or skin L3, those components being of thicknesses $h_1$, $h_2$ and $h_3$ respectively.

Embodiments of laminated glass articles in accordance with the present description include those wherein both of the surface or skin portions or layers of the laminate are composed of the same glass, but wherein the thickness of one skin layer differs from that of the other skin layer. In those embodiments each of the three glass layers (first surface layer L1, core layer L2 and second surface layer L3) will experience bending moments $M_1$, $M_2$, and $M_3$ respectively, due to the differing direct compressive forces $N_1$ and $N_3$ and tensile force $N_2$ that develop in the skins and core, respectively, during the cooling and contraction of the layers of the article following high-temperature lamination. Again the unconstrained laminates will exhibit some cylindrical warping due to their asymmetric stress profiles, but the amounts of warp are generally small.

As the following analysis will show, the expressions for forces $N_1$, $N_2$, and $N_3$, and bending moments $M_1$, $M_2$ and $M_3$ developed below satisfy the applicable force equilibrium and Moment/warp relationships, namely $$N_1 + N_2 + N_3 = 0 \quad (201)$$

$$M_1 + M_2 + M_3 = M = (1+\rho)(D_1 + D_2 + D_3)/\rho \quad (202)$$

where the D values denote the bending rigidities of the layers and ρ represents the common radius of curvature of the structure where warping due to asymmetric surface compression levels occurs.

The pertinent equations for direct stress ($\sigma_d$) and bending stress ($\sigma_b$) are summarized as follows:

$$\sigma_{d1} = N_1/h_1 \quad (203)$$

$$\sigma_{d2} = N_2/h_2 \quad (204)$$

$$\sigma_{d3} = N_3/h_3 \quad (205)$$

$$\sigma_{b1} = 6M_1/h_1^2 \quad (206)$$

$$\sigma_{b2} = 6M_2/h_2^2 \quad (207)$$

$$\sigma_{b3} = 6M_3/h_3^2 \quad (208)$$

wherein $h_1$, $h_2$ and $h_3$ are the thicknesses of the first surface layer L1, core layer L2, and second surface layer L3, respectively, and wherein $$N_1 = [\{(a_3+b_2+b_3)\}(\alpha_c-\alpha_s)(T_{set}-25)]/\Delta \quad (209)$$

$$N_3 = [\{(a_1+b_1+b_2)\}(\alpha_c-\alpha_s)(T_{set}-25)]/\Delta \quad (210)$$

$$N_2 = -(N_1+N_3)$$

$$\Delta = (a_2-b_2)^2 - (a_1+a_2+b_1(a_2+a_3b_3) \quad (211)$$

$$M_1 = \{D_1/(D_1+D_2+D_3)\}M \quad (212)$$

$$M_2 = \{D_2/(D_1+D_2+D_3)\}M \quad (213)$$

$$M_3 = \{D_3/(D_1+D_2+D_3)\}M \quad (214)$$

$$M = 0.5[N_1(h_1+h_2) - N_3(h_2+h_3)] \quad (215)$$

with:

$\alpha_c$ and $\alpha_s$ being the thermal expansion coefficients of the core and skin layers at the thermal set points of the glasses making up those layers, and with $a_1$, $a_2$, $a_3$, $b_1$, $b_2$ and $b_3$ being constants related to the skin and core layer thicknesses $h_1$, $h_2$ and $h_3$, Young's Modulus E, and Poisson's Ratios υ of the core and skin glasses as:

$$a_1 = (1-\upsilon)/(E_1 h_1) \quad (216)$$

$$a_2 = (1-\upsilon)/(E_2 h_2) \quad (217)$$

$$a_3 = (1-\upsilon)/(E_3 h_3) \quad (218)$$

$$b_1 = (h_1+h_2)^2/[4(1+\upsilon)(D_1+D_2+D_3] \quad (219)$$

$$b_2 = (h_1+h_2)(h_2+h_3)/[4(1+\upsilon)(D_1+D_2+D_3)] \quad (220)$$

$$b_3 = (h_2+h_3)2/[4(1+\upsilon)(D_1+D_2+D_3)] \quad (221)$$

For any particular laminated glass article of the kind herein described, the total stress in each of the three layers is simply the sum of the direct and bending stresses in that layer. The total stresses for layers L1, L2 and L3 are given respectively by:

$$\sigma_1 = (N_1/h_1) + (6M_1/h_1^2) \quad (222)$$

$$\sigma_2 = (N_2/h_2) + (6M_2/h_2^2) \quad (223)$$

$$\sigma_3 = (N_3/h_3) + (6M_3/h_3^2) \quad (224)$$

For the asymmetrically stressed surface layers of the strengthened articles of the present disclosure, the direct stresses ($N_1/h_1$) and ($N_3/h_3$) are compressive or negative skin stresses and the direct stress ($N_2/h_2$) is a tensile or positive core stress. Similarly, where the first surface layer has a thickness $h_1$ that is greater than $h_3$, bending moments $M_1$ and $M_3$ have a sign such that $(6M_1/h_1)^2$ and $(6M_3/h_3)^2$ are compressive or negative stresses on one of the surfaces of first and third layers. The tensile component $(6M_2/h_2)^2$ will occur either at top of core layer L2 or the bottom of that core layer depending on whether layer L3 is thicker than layer L1 or vice-versa. In short, the tensile stress in the core layer is the sum of direct and bending stresses in that layer. Advantageously, either layer L1 or layer L3 will experience maximum compressive stress on their exposed outer surfaces where maximum damage resistance is desired. As noted above, the depths of surface compression are simply the respective thicknesses $h_1$ and $h_3$ of the compressively stressed surface layers.

As in other asymmetrically stressed glass articles provided in accordance with the present disclosure, unequal skin thicknesses $h_1$ and $h_3$ produce an asymmetric stress distribution that tends to warp the article into a cylindrical shape of radius ρ. That radius is given by $$\rho = D_1(1+\upsilon)/M_1 = D_2(1+\upsilon)/M_2 = D_3(1+\upsilon)/M_3 \quad (225)$$

with the sagitta or maximum warp being given by $$\delta = L^2/(8\rho) \quad (226)$$

wherein L denotes the longer dimension of 3-layer laminate.

The use of the foregoing analyses to calculate the asymmetric stress distributions that can be generated in laminated glass articles is illustrated below for the case of a three-layer article wherein the compressively stressed surface layers are of the same composition but different thicknesses. For the purpose of analysis the total thickness of the laminated article and the thickness $h_2$ of the glass core are kept constant while the skin thicknesses $h_1$ and $h_3$ are varied to determine the effects of the asymmetric geometries on surface compression levels and the levels of tensile stress in the core portion. As a specific example, a laminate of 2.677 mm total thickness (h1+h2+h3) and 2.54 mm core thickness is analyzed.

The physical properties of skin and core glasses for the laminated article are set forth in Table 4 below. Included in Table 4 for each of the core and skin glasses are the elastic or Young's Modulus, in GPa, the Poisson's Ratio, the Glass Set Point or temperature at which the glass solidifies on cooling, in ° C., and the thermal expansion of each glass at the Set Point.

TABLE 4

Properties of Core and Skin Glasses

| Glass Component | Young's Modulus E (GPa) | Poisson's Ratio ν | Glass Set Point (° C.) | Thermal Expanion α at Set point ($10^{-7}$/C.) |
|---|---|---|---|---|
| Core | 75.0 | 0.22 | 562 | 74.5 |
| Skin | 85.5 | 0.22 | 675 | 52.0 |

Figure 6:
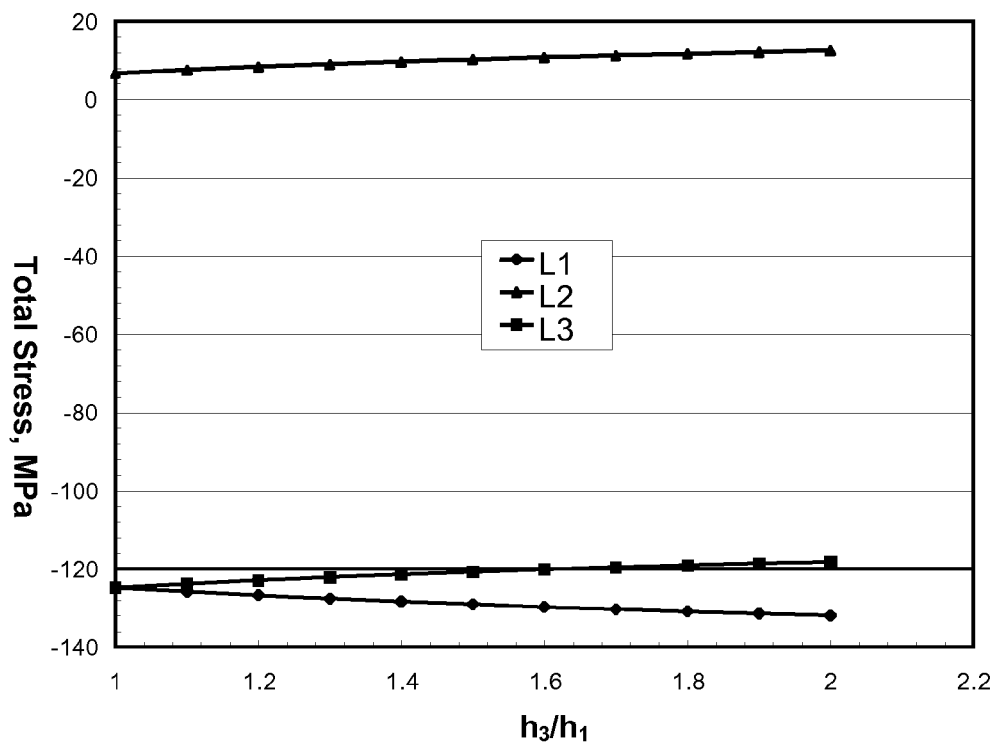
FIG. 6 is a diagram plotting total stress versus surface thickness for laminated glasses.

The glass articles evaluated included glass laminates wherein the ratio of L1 surface layer thickness to L3 surface layer thickness ranged from 1 to 2. Results of these evaluations for a number of laminated glass articles incorporating asymmetric surface layers are set forth in FIG. 6 of the drawings. FIG. 6 plots the total stresses calculated on outer surfaces of layers $L_1$ and $L_3$ as well as in layer 2 for each of the three layers for each of ten laminated articles having surface layer thickness ratios $h_3/h_1$ in the above range.

The total stress values plotted in FIG. 6 are combinations of the direct stresses and bending stresses in each layer in accordance with the above analyses. The observed trends in L1 and L3 total stress levels are due mainly to the same trends in the direct stress levels calculated for those layers. The bending stresses in the surface layers are calculated to be small due to the low bending rigidities ($D_1$ and $D_3$) of the surface layers.

Particularly advantageous features of the asymmetrically stressed laminates of these embodiments of the present disclosure are the relatively modest center tensions maintained in the cores notwithstanding the relatively high compressive stresses developed in the surface layers. This combination of features provides excellent surface damage resistance without undesirable increases in tensilely stressed fracture energy of layer $L_2$. It would permit the strengthened glass articles to be scored and separated safely with little risk of long-term fatigue of exposed edges of the separated sections. In addition, the maximum warp values calculated for the most highly stressed laminates, i.e., less than 0.1 mm over a 10-cm laminate span, would not be of concern for most applications.

As the foregoing analyses suggest, asymmetrically strengthened glass sheet products, including for example glass display panels or display cover sheets, or even glass panes employed as glazing elements in other devices or structures, are of particular interest where the intended application involves exposure to repeated physical contact or a high risk of impact damage. For these and other applications, however, it is generally important that the sheet surface exhibiting the lower level of compressive surface stress not be subjected to tensional stress, physical tension, and that the level of tension in the core of the sheet not be so great as to develop unacceptably high fracture energy in the strengthened glass product.

In light of these considerations specific embodiments of the presently disclosed articles particularly include glass sheets having opposed compressively stressed first and second surfaces joined to a tensiley stressed interior core, wherein the first surface has a higher level of surface compression than the second surface, and wherein the core has a tensile stress level not exceeding about 20 MPa. Embodiments of such sheets wherein the level of compressive stress in the compressively stressed second surface is at least 300 MPa, both for the unconstrained sheet and for the sheet when edge-constrained to remove sheet warping due to asymmetric surface stresses.

Methods for making glass articles such as strengthened glass sheets or vessels in accordance with the foregoing disclosure are carried out utilizing apparatus and materials employed in the prior art for tempering, ion-exchanging and/or laminating heated or softened glasses. For the manufacture of a strengthened glass sheet having opposing first and second compressively stressed surfaces bound to a tensilely stressed core with the first surface having a higher level of surface compression than the second surface, the glass sheet is cooled from a temperature above the glass set point in a manner such that the first and second surfaces are cooled at different cooling rates. In particular embodiments, for example, the first surface of the sheet is cooled at a cooling rate $R_1$ and the second surface is cooled at a lower cooling rate $R_2$, and the ratio $R_2/R_1$ is selected to be at least at least 0.7.

For the manufacture of strengthened glass sheet having an asymmetric stress profile via ion-exchange, a step of subjecting the first and second surfaces of the sheet to different ion-exchange strengthening treatments is used. Thus the first surface is subjected to a first ion-exchange treatment and the second surface is sequentially or concurrently subjected to a second ion-exchange treatment differing from the first treatment. In particular embodiments, the first ion-exchange treatment develops a concentration $C_1$ of exchanged ions in the first surface of the sheet and the second ion-exchange treatment develops a concentration $C_2$ of exchanged ions in the second surface of the sheet, with $C_1$ differing from $C_2$ to a degree effective to develop a selected asymmetric stress profile characterized by differing levels of surface stress in the glass.

The manufacture of strengthened glass sheets or other articles having asymmetric surface compression in opposing surfaces does not require the use of only one strengthening strategy to achieve the desired stress profiles. Rather, these strengthening methods can be advantageously combined to develop asymmetric profiles not achievable using any one strategy alone.

As one example, a strengthened glass sheet having opposing first and second compressively stressed surfaces of differing stress level can be made by the steps of first cooling the surfaces from a temperature above the glass set point to develop first and second levels of compressive stress in those surfaces, and then subjecting the first and second surfaces to ion-exchange strengthening to modify at least one of the first and second compressive stresses. At least one of these steps will be carried out in a manner that develops a higher level of compressive stress in the first surface than in the second surface.

A further example of a combination method for making a strengthened sheet or other article comprises a first step of laminating first and second glass skin layers to a glass core layer to form a laminated glass sheet having first and second levels of compressive stress in opposing first and second surfaces of the sheet; and a second step of subjecting the first and second surfaces to ion-exchange strengthening to modify at least one of the first and second compressive stresses. Again, at least one of the two steps is conducted to develop a higher level of compressive stress in the first surface than in the second surface.

Yet another embodiment of a combination method for manufacturing a strengthened glass sheet having a first surface having a higher level of surface compression than a second surface comprises the steps of laminating first and second glass skin layers to a glass core layer to form a laminated glass sheet having first and second levels of compressive stress in opposing first and second surfaces of the sheet, and then cooling the first and second surfaces from a temperature above the set points of the surfaces to modify at least one of the first and second compressive stresses. Either the lamination step, or the cooling step, or both, will be carried out in a way that develops a higher level of compressive stress in the first surface than in the second surface.

Further embodiments of the disclosed asymmetrically stressed glass articles include articles essentially free of stress-induced warping that still retain an asymmetric stress profile. As above equation (226) suggests, sagitta or maximum warp δ vanishes when the radius of curvature ρ of a surface-stressed article approaches infinity, i.e., when bending moment M from equation (202) above approaches zero. Of course a trivial solution meeting those conditions is that of a symmetrical laminate with opposing surface portions (e.g., skin glass layers) of identical thickness and composition. In that case the thermal expansions and elastic moduli of the layers are necessarily the same, such that no asymmetric stress profile is present.

In accordance with the present disclosure, however, articles substantially free of stress-induced warping, but still offering asymmetric stress profiles, are provided through the use of opposing first and second compressively stressed surface portions that differ in both composition and thickness. The compositions and thicknesses selected are those effective to generate differing surface compression levels, but that do not introduce changes in curvature or flatness in the stressed articles. Examples include surface-stressed articles such as laminated articles that have a bending moment M as defined by the expression $M=(1+\rho)(D_1+D_2+D_3)/\rho$ of substantially zero, wherein $D_1$, $D_2$ and $D_3$ correspond, respectively, to the bending rigidities of the first surface portion, a glass core, and a second surface portion, and wherein ρ represents the common radius of curvature of the stressed article arising from warping due to asymmetric surface compression levels.

To arrive at a numerical expression defining the thicknesses, thermal expansions, and elastic moduli suitable for providing such articles, the expressions for $N_1$ and $N_3$ from equations (209) and (210) above are substituted into equation (215) above to yield:

$$(h_1+h_2)(a_3+b_2+b_3)(\alpha_c-\alpha_{s1})=(h_2+h_3)(a_1+b_1+b_2)(\alpha_c-\alpha_{s2}) \quad (227)$$

Then, setting $\upsilon_1=\upsilon_2=\upsilon_3=\upsilon$, which is valid for most silicate glasses, it can be shown from equations (216) to (221) that:

$$a_3+b_2+b_3=(1-\upsilon)[E_1h_1^3+E_2h_2^3+E_3h_3^3+3E_3h_3(h_1h_2+2h_2^2+3h_2h_3+h_1h_3+h_3^2)]/\Delta_1 \quad (228)$$

and $$a_1+b_1+b_2=(1-\upsilon)[E_1h_1^3+E_2h_2^3+E_3h_3^3+3E_3h_3(h_1h_2+2h_2^2+3h_2h_3+h_1h_3+h_3^2)]/\Delta_2 \quad (229)$$

wherein $$\Delta_1=E_3h_3(E_1h_1^3+E_2h_2^3+E_3h_3^3)$$

and $$\Delta_2=E_1h_1(E_1h_1^3+E_2h_2^3+E_3h_3^3)$$

Substituting the above expressions in equation (227) above, and simplifying, yields the following relationship between the expansion mismatches, elastic moduli, and stressed surface portion (e.g., skin glass) thicknesses for a family of asymmetrically stressed glass articles substantially free of surface warping:

$$(\alpha_c-\alpha_{s1})/(\alpha_c-\alpha_{s2})=\{(h_2+h_3)/(h_2+h_1)\}[h_1^2+(E_2/E_1)(h_2^3/h_1)+(E_3/E_1)(h_3^3/h_1)+3(h_1^2+3h_1h_2+h_1h_3+2h_2^2+h_2h_3)]/[h_3^2+(E_2/E_3)(h_2^3/h_3)+(E_1/E_3)(h_1^3/h_3)+3(h_3^2+3h_3h_2+h_1h_3+2h_2^2+h_2h_1)] \quad (230)$$

While the above equation clearly encompasses the case where $h_1=h_3$ and $E_1=E_3$, (i.e., the case of identical skin properties and skin thicknesses), a large group of asymmetrically stressed laminates or other articles wherein the thicknesses and elastic modulii of the opposing skin layers or surface portions are dissimilar is also defined. The latter group can be generally characterized as articles that include three different glass compositions, selected to provide a high compression first surface portion or skin, a core, and a lower compression second surface portion or skin, such that warping of the article is mitigated even though at least one highly stressed, damage resistant surface layer is provided.

Of course, the foregoing descriptions and specific embodiments of the disclosed articles and methods are presented for purposes of illustration only, it being apparent from those descriptions that a wide variety of adaptations and modifications of those particularly disclosed embodiments may be adopted to meet the requirements of a variety of applications within the scope of the appended claims.

What is claimed is:

1. A glass article having opposing first and second compressively stressed surface portions bound to a tensilely stressed core portion, the opposing first and second compressively stressed surface portions comprising first and second glass skin layers laminated to the tensilely stressed core portion to form a laminated article, the glass article having a stress profile resulting from subjecting the laminated article to an ion-exchange treatment, wherein the first surface portion has a higher level of surface compression than the second surface portion, wherein the opposing first and second compressively stressed surface portions are of differing composition and thickness, and wherein the glass article has a bending moment M as defined by the expression $M=(1+\rho)(D_1+D_2+D_3)/\rho$ of substantially zero, wherein $D_1$, $D_2$ and $D_3$ correspond, respectively, to bending rigidities of the first glass skin layer, the tensilely stressed core portion, and the second glass skin layer, and ρ represents a common radius of curvature of the glass article.

2. A glass article according to claim 1 wherein the surface compression in at least the first surface portion is developed at least partially through the ion-exchange treatment of the first surface portion.

3. A glass article according to claim 1 wherein the opposing first and second glass skin layers are of different expansivity α'.

4. A glass article according to claim 1 having the form of a glass sheet, and wherein the tensilely stressed core portion has a tensile stress level not exceeding 20 MPa.

5. A glass article according to claim 4 wherein the level of surface compression in the second compressively stressed surface portion is at least 300 MPa.

6. A glass article comprising:

opposing first and second glass skin layers laminated to a glass core layer, each of the first and second glass skin layers comprising a lower thermal expansion than the glass core layer, and at least a portion of a stress profile of the glass article comprising an error function profile; and a bending moment M as defined by the expression $M=(1+\rho)(D_1+D_2+D_3)/\rho$ of substantially zero, wherein $D_1$, $D_2$ and $D_3$ correspond, respectively, to bending rigidities of the first glass skin layer, the glass core layer, and the second glass skin layer, and wherein p represents a common radius of curvature of the glass article.

7. A glass article according to claim 6, wherein the error function profile results from subjecting at least one of the first glass skin layer or the second glass skin layer to an ion-exchange treatment.

8. A glass article according to claim 6, wherein the stress profile comprises an asymmetric stress profile resulting from a combination of an ion-exchange treatment and at least one of (a) different thicknesses of the opposing first and second glass skin layers or (b) different thermal expansions of the opposing first and second glass skin layers.

9. A glass article according to claim 6 wherein the first glass skin layer comprises a different glass composition than the second glass skin layer.

10. A glass article according to claim 6 wherein each of the first glass skin layer and the second glass skin layer comprises a surface compression of at least 300 MPa.

11. A glass article according to claim 10 having the form of a glass sheet, wherein the glass core layer comprises a tensile stress level not exceeding 20 MPa.

12. A glass article comprising;

opposing first and second compressively stressed surface portions bound to a tensilely stressed core portion, the opposing first and second compressively stressed surface portions comprising first and second glass skin layers laminated to the tensilely stressed core portion to form a laminated article;

a stress profile resulting from subjecting the laminated article to an ion-exchange treatment; and a bending moment M as defined by the expression $M=(1+\rho)(D_1+D_2+D_3)/\rho$ of substantially zero, wherein $D_1$, $D_2$ and $D_3$ correspond, respectively, to bending rigidities of the first glass skin layer, the tensilely stressed core portion, and the second glass skin layer, and wherein $\rho$ represents a common radius of curvature of the glass article.

13. The glass article according to claim 12, wherein each of the first and second glass skin layers comprises a lower thermal expansion than the tensilely stressed core portion.

14. A glass article according to claim 12 wherein the first glass skin layer comprises a different glass composition than the second glass skin layer.

15. The glass article according to claim 12, wherein at least a portion of the stress profile of the glass article comprises an error function profile resulting from subjecting the laminated article to the ion-exchange treatment.

16. A glass article according to claim 15, wherein the stress profile comprises an asymmetric stress profile resulting from at least one of (a) subjecting the laminated article to the ion-exchange treatment, (b) different thicknesses of the first and second glass skin layers, or (c) different thermal expansions of the first and second glass skin layers.

* * * * *